Patented Feb. 20, 1951

2,542,364

UNITED STATES PATENT OFFICE 2,542,364

HYDRAULIC CEMENTS AND METHOD OF MAKING

Fritz A. Schenker and Alphons Ammann, Zurich, Switzerland, assignors to Kaspar Winkler & Co., Zurich-Altstetten, Switzerland, a copartnership consisting of Kaspar Winkler and Fritz A. Schenker No Drawing. Application December 13, 1946, Serial No. 716,172. In Switzerland December 29, 1945

14 Claims. (Cl. 106—88)

This invention relates to new and improved concrete, mortars and the like. More particularly, it relates to concrete or mortar which, in its hardened form, has improved resistance to frost and to the agents which, when incorporated in the cement or mortar, impart the improved frost-resisting properties to such concrete or mortar.

United States Patent 2,174,051 discloses the incorporation of agents to concrete or mortar whereby the fluidity of the cement particles (suspensoids) is increased and the water-cement ratio reduced without sacrificing workability. Such agents, termed "fluidity-increasing agents," are non-foamers, i. e. do not produce a foam, and also do not reduce the surface tension of the water added to the cement mix. However, such fluidity-increasing agents do not improve the frost-resisting properties of the cement because they do not increase, but rather decrease, the peculiarity of cement to produce "bleeding." Due to bleeding, channels similar to those formed by suction and which produce undesirable effects in regard to frost-resistance are obtained. The formation of channels offsets the improvements which are obtained due to the increase in fluidity of the cement particles and reduced water-cement ratio.

Frost-resisting properties of concrete and cement have been improved when gas-entraining agents are incorporated in concrete or mortar. Such gas-entraining agents, during the period of mixing, produce a large quantity of small air pores which are entrained in the concrete or mortar. In spite of the fact that the pores may be connected with capillaries, they can only be partly filled with water. However, the improvement in frost-resistance by the use of gas-entraining agents is only obtained by sacrificing other important and desirable properties of the concrete. By entraining air in concrete or mortar, the specific gravity, compressive and flexural strength, the adhesion to steel, and the adhesive strength toward concrete are considerably reduced, whereby the general use of such frost-resisting concrete is either restricted or requires special precautions.

An object of this invention is to provide concrete, mortars, etc. containing hydraulic binding agents and which in their hardened form have improved frost-resistance.

Another object of this invention is to provide an addition which, when incorporated in concrete or cement, will produce a product having improved frost-resistance properties without sacrificing other desirable properties.

Other and additional objects will become apparent hereinafter.

The objects of the invention are accomplished, in general, by incorporating both a fluidity-increasing agent and a gas-entraining agent in concrete or mortars containing a hydraulic binding agent.

The agents can be added simultaneously, as in a mixture, or separately during or after the manufacture of the cement, or after grinding of the clinkers, or during the mixing of the cement or mortar. When they are added during the preparation of the concrete mix, they can be added to the cement, to the aggregate, to the water or to any other part of the mix prior to mixing, or they may be added to the entire mix at any time prior to the completion of the mixing. They can be added in dry form or in aqueous solution. One of the agents can be incorporated in the cement during or after the manufacture thereof and the other incorporated in the concrete or mortar during the preparation thereof. Thus, for example, the gas-entraining agent can be added to the clinkers or to the cement, and the fluidity-increasing agent subsequently added, as, for instance, at the building site when the concrete or mortar is produced.

Any fluidity-increasing agent or mixture of such fluidity-increasing agents can be used. In general, and as referred to in the claims, by "fluidity-increasing agent" is meant a compound that reduces the volume of the paste in concrete without reducing the surface tension of the water, whereby when water is added to a cement, mortar or concrete containing such agent the fluidity of the cement particles is increased but the harshness of the mix is not improved. Fluidity-increasing agents, such as non-foaming organic hydroxylated carboxylic acid compounds containing aliphatic groups in the nucleus and preferably containing at least two hydroxy groups combined by aliphatic groups in the nucleus, for example tartaric acid, citric acid, saccharic acid, tetrahydroxy adipic acid, their salts and derivatives, as disclosed in United States Patent 2,174,051; compounds of the nature of amino acids that contain more than one carboxylic group in alpha position and have the general formula of $RN(CH_2COOH)_x$, wherein R is any radical or group and $n$ is at least 2, such as, for example, nitrilo-triacetic acid, ethylene-diamino-tetra-acetic acid, imino diacetic acid, methyl amino diacetic acid, anthranilacid N-diacetic acid, uramil 7,7-diacetic acid, ortho-benzene-disulfonic acid, etc. are illustrative examples of fluidity-increasing agents.

The gas-entraining agent can be either an air-entraining agent or a gas-forming agent. In general, and as referred to in the claims, by "air-entraining agent" is intended any surface-active agent which reduces the surface tension of water in alkaline solution, which is soluble in alkaline solutions and which forms a large quantity of small gas pores in alkaline solutions by foaming action or by gas releasing chemical reaction with other agents in the mix. Artificial or natural resins which are insoluble in neutral or acid water but which are soluble in alkali solutions can be used. Fir or pine tree resins insoluble in gasoline and other aromatic solvents, Colophonium, Copals, and the like are illustrative examples of natural resins which can be used. The fir or pine tree resins, commercially sold under the trade-name "Vinsol," can be obtained by the process disclosed in United States Patent 2,193,026. Equally satisfactory are the resinates, particularly in the form of the alkaline salts. Very suitable also are wetting agents, such as soluble alkali salts of sulfonates or sulfates, such as, for example, lauryl sulfates or sulfonates, sold under the trade-names "Igepone" and "Sandopone," alkali-soluble synthetic resins such as condensation products of casein and formaldehyde, phenol and formaldehyde, or cresol and formaldehyde resins. Alkali salts of fatty acids are not suitable in spite of the fact that they are wetting agents because they form insoluble earth alkali or aluminum salts and they are, therefore, precipitated when they are mixed with mortar or concrete.

Metals or compounds releasing gases in alkaline solution are also suitable as the gas-forming agents. When metals are employed, such metals are in the form of extremely fine powders. Calcium, magnesium or aluminum or their alloys are illustrative examples of metals which, in contact with cement, produce hydrogen.

If desired, mixtures of gas-entraining agents, such as mixtures of air-entraining agents, a mixture of gas-forming agents, or mixtures of an air-entraining agent and a gas-forming agent can be used.

In general, to obtain frost-resistant concrete, the volume of air or gas entrained in the cement is from 3% to 8% per volume above that normally entrained in cement. The gas-entraining agent, i. e. air-entraining agent or gas-forming metal, is utilized in small amounts and depending on its efficiency can range from 0.005% to 0.5% of the weight of the hydraulic binding agent. The fluidity-increasing agent is utilized also in small amounts. Usually, the quantity of the fluidity-increasing agent is from 0.02% to 0.5% of the weight of the hydraulic binding agent.

The results obtained by this invention are indeed surprising and unexpected. According to United States Patent 2,174,051, the addition of a fluidity-increasing agent, such as an oxy acid, to concrete or mortar produces an increase of the specific weight and the oxy acid increases the surface tension of the water whereby the production of foam is inhibited. It was therefore to be expected that when a combination of a fluidity-increasing agent, such as an oxy acid, and an air-entraining agent were added, the foam-producing properties of the air-entraining agent and therefore the formation of closed air pores would be influenced unfavorably. Surprisingly, however, the air content of 1:4 mortar for instance, in which both an air-entraining agent and a fluidity-increasing agent were incorporated, showed no unfavorable effect of the pore formation. On the contrary and most amazing, an increase in foam-forming characteristics was obtained, as shown by the following Table I:

*Table I*

| Sodium resinate [1] addition in per cent of the quantity of cement | Air content of the mortar in per cent by volume | Combined addition in per cent based on cement | | Air content of mortar for the combined addition in per cent of volume | Increase of air content in per cent of the air content without calcium salt of dextro acid |
|---|---|---|---|---|---|
| | | Sodium resinate [1] | Calcium salt of dextro acid (tetra-hydroxy adipic acid) | | |
| ---------- | 2.3 | ---------- | ---------- | ---------- | ---------- |
| 0.01 | 9.0 | 0.01 | 0.125 | 10.2 | 13.3 |
| 0.02 | 14.4 | 0.02 | 0.125 | 16.5 | 14.6 |
| 0.03 | 17.6 | 0.03 | 0.125 | 19.7 | 11.9 |
| 0.04 | 21.0 | 0.04 | 0.125 | 21.8 | 3.8 |

[1] The sodium resinate is "Vinsol" resin neutralized with caustic soda.

From Table I, it is apparent that to produce a cement or concrete of a certain air content, the proportion of the air-entraining agent can be reduced approximately 10% when a fluidity-increasing agent, such as the calcium salt of tetra-hydroxy adipic acid, is used. This also causes elimination or at least considerable reduction of undesirable bleeding.

Hydraulic binding agents require water for hardening. For the complete hydration of Portland cement, 12% to 15% water is required. Most of the surplus water, which is added when cement or concrete is mixed, remains in the paste in the form of fine capillaries or pores. For example, 1 cubic yard of concrete made with 5¼ bags of cement and having a water-cement ratio of 0.6, has a pore volume resulting from surplus water of approximately 3¾ cubic feet. The water thus obtained in the capillaries can, for instance, evaporate. The capillaries can, however, fill up with water immediately when they come in contact with it. These capillaries are of the greatest importance in regard to the behavior of cement against frost action. The great advantage caused by the addition of a fluidity-increasing agent is air and afterwards 14 days in water. Two of each of the respective 4 beams were then frozen and thawed 50 times, and the other two were stored in water. After the 50 cycles of freezing and thawing, all specimens were tested for flexural and compressive strengths. The results as well as additional information are given in Table II:

Table II

| Addition | Addition per cent of the cement content | Gaging water in per cent of the dry mixture | Specific weight of the hardened mortar | Without freezing | | After 50 cycles of freezing and thawing | | Reduction of strength caused by freezing | |
|---|---|---|---|---|---|---|---|---|---|
| | | | | Compressive strength, p. s. i. | Flexural strength, p. s. i. | Compressive strength, p. s. i. | Flexural strength, p. s. i. | Compressive strength, p. s. i. | Flexural strength, p. s. i. |
| ---------- | ---------- | 10 | 2.20 | 2,865 | 708 | 2,475 | 391 | 390 | 317 |
| ---------- | ---------- | 12 | 2.15 | 2,260 | 617 | 1,620 | 278 | 640 | 339 |
| ---------- | ---------- | 14 | 2.11 | 1,705 | 528 | 809 | 91 | 896 | 437 |
| Tetrahydroxy adipic acid | 0.125 | 9.5 | 2.21 | 3,565 | 863 | 2,615 | 494 | 950 | 369 |
| | | 11.0 | 2.18 | 2,770 | 743 | 1,463 | 254 | 1,307 | 489 |
| | | 13.0 | 2.16 | 2,530 | 517 | 981 | 45 | 1,549 | 472 |
| Vinsol resin | 0.025 | 9.75 | 2.16 | 2,585 | 613 | 2,300 | 528 | 285 | 85 |
| | | 11.75 | 2.10 | 2,160 | 514 | 1,835 | 344 | 325 | 170 |
| | | 13.5 | 2.04 | 1,450 | 448 | 115 | 364 | 1,335 | 84 |
| Tetrahydroxy adipic acid | 0.125 | 9.25 | 2.18 | 3,720 | 809 | 3,505 | 781 | 215 | 28 |
| Vinsol resin | 0.025 | 11.0 | 2.14 | 2,610 | 683 | 2,595 | 625 | 15 | 58 |
| | | 12.5 | 2.09 | 2,115 | 594 | 2,075 | 579 | 40 | 15 | p. s. i. = pounds per square inch.

that the pore volume of the capillaries of the concrete or cement is reduced in accordance with a reduction of the water-cement ratio. The reduction of the pore volume, according to the example set forth in this paragraph, can be from 0.35 to 0.55 cubic feet per cubic yard of concrete.

In view of the fact that air-entraining agents produce a porous cement paste, which pores cannot be filled with water, the volume of air necessary to produce frost-resistance can be smaller when reducing the capillary pore volume. As proven by tests using combined additions of a fluidity-increasing agent and a gas-entraining agent, a reduction of the water-cement ratio is possible together with a simultaneous gas-entrainment. In this manner, mortar or concrete can be produced which upon exposure shows an improvement against frost as well as improvements in other properties which cannot be obtained by adding the fluidity-increasing agent alone or adding the gas-entraining agent alone. Among the improved results obtained by the conjoint use of the fluidity-increasing agents and the gas-entraining agents are the following:

Reduction of water absorption;
Improvement of resistance to frost and climatic influences;
Flexural and compressive strengths;
Adhesion to steel and in construction joints due to reduction or elimination of scum.

In order to show the results obtained by this invention, tests were carried out using comparative mortars: (a) mortars consisting of 1 part cement, 6 parts sand, with 12%, 13% and 14% gaging water respectively, and (b) mortars of the same composition but using additions with a reduction of the water-cement ratio to obtain the same workability, the uniformity of the workability being determined by measuring the spread on a flow table according to Haegermann. Each mortar was mixed for 3 minutes and each mortar was formed into 4 beams, 4 x 4 x 16 cm. The additions, listed in percent of the quantity of cement, were added in the form of powder prior to the gaging of the mortar. After stripping, each specimen beam was stored for 14 days in moist As shown by Table II, the reduction in strength of the specimens without addition caused by frost is considerable, and the higher the water-cement ratio the greater the reduction. The addition of a fluidity-increasing agent alone resulted in higher strengths, but the reduction in strength caused by frost was greater although the final strength was as high as or higher than those of the specimens without addition. The addition of air-entraining agents alone produced a considerable improvement in the resistance to frost, but the strengths were substantially lower than those of the specimens which contained no addition. The specimens containing both an air-entraining agent and a fluidity-increasing agent showed a very pronounced improvement with respect to frost-resistance, so that these specimens can be considered to be substantially completely resistant to frost. In those specimens containing an air-entraining agent and a fluidity-increasing agent, a reduction in strength does not occur even with increased addition of water. This is in spite of the fact that in the tests, those specimens containing only one addition compound showed a considerable reduction in strength with increased addition of water. The improvements obtained by the conjoint use of both an air-entraining agent and a fluidity-increasing agent are indeed surprising, since the improvement in resistance to frost and in compressive strength could not be predicted on the basis of the individual conditions.

It is known that air-entraining agents reduce considerably the bond of concrete to steel and also that fluidity-increasing agents increase such bond considerably. It was therefore to be expected that the conjoint use of an air-entraining agent and a fluidity-increasing agent would show a bond strength which is lower than the one obtained by the use of the fluidity-increasing agent alone by at least the reduction obtained by the use of an air-entraining agent alone. Tests show that this assumption is not correct. When both an air-entraining agent and a fluidity-increasing agent are used, the air-entraining agent reduces the increase in adhesive strength caused by the fluidity-increasing agent to a considerably lesser degree than expected, as shown by the results set forth in the following table III:

ployed with other materials which are commonly added to concrete and mortar mixes, such as Table III

| Addition | In per cent of cement | Water-cement ratio | Specific weight plastic concrete | Bond to steel p. s. i. | Improvement per cent | Bond in joints p. s. i. | Improvement per cent | Compressive strength, 7 days p. s. i. | Improvement per cent |
|---|---|---|---|---|---|---|---|---|---|
| Without addition | | 0.65 | 2.43 | 672 | | 244 | | 2,485 | |
| Calcium salt of tetrahydroxy adipic acid | 0.125 | 0.57 | 2.45 | 873 | +30.0 | 389 | +59.0 | 3,050 | +23.0 |
| Sodium resinate of Vinsol resin | 0.02 | 0.62 | 2.27 | 362 | −46.2 | 166 | −32.0 | 1,905 | −23.5 |
| Lauryl alcohol sulfate | 0.02 | 0.59 | 2.35 | 497 | −26.0 | 102 | −58.1 | 2,130 | −14.3 |
| Aluminum in powder form | 0.03 | 0.61 | 2.35 | 487 | −26.0 | 111 | −54.7 | 2,205 | −11.2 |
| Calcium salt of tetrahydroxy adipic acid / Sodium resinate of Vinsol resin | 0.125 / 0.02 | 0.54 | 2.31 | 645 | −3.7 | 258 | +6.0 | 2,130 | −14.3 |
| Calcium salt of tetrahydroxy adipic acid / Lauryl alcohol sulfate | 0.125 / 0.02 | 0.55 | 2.40 | 745 | +11.0 | 425 | +74.0 | 3,740 | +50.0 |
| Calcium salt of tetrahydroxy adipic acid / Aluminum powder | 0.125 / 0.03 | 0.57 | 2.44 | 770 | +15.0 | 185 | −24.4 | 2,770 | +11.0 | p. s. i. = pounds per square inch.

In Table III, concrete of plastic consistency was made of 1 part cement, 2½ parts sand and 5 parts of coarse aggregate. Such concrete was made without and with the various additions set forth in the table, the additions being added in dry form before or during mixing. The quantity of water added was measured so that a slump of 2 to 2½″ was obtained. Cubes 4″ x 4″ x 4″ were made with a smooth steel bar of 0.4″ diameter and 5″ in length embedded therein. After curing for 7 days, the adhesive strength of the steel to the concrete was determined by pulling out the steel bar.

As shown by Table III, when an air-entraining agent is used, the bond strength of the concrete to steel is materially reduced.. However, by the conjoint use of the fluidity-increasing agent and the gas-entraining agent, the detrimental effect of the gas-entraining agent is overcome and considerable improvement in bond strength obtained.

The formation of scum and laitance on the surface of the concrete, which is more or less pronounced depending upon the consistency, is very undesirable. These layers of scum, which are present partly as compact, shiny, and partly as loose layers, have insufficient adhesion to the concrete. Air-entraining agents enhance the unfavorable conditions in construction joints. By the present invention, wherein gas-entraining agents and fluidity-increasing agents are conjointly used, the undesirable action of the air-entraining agents and the desirable action of the fluidity-increasing agents are not additive, but the desirable action of the fluidity-increasing agents is more pronounced and prominent.

In order to determine the bond in joints, the lower half of an upright form for producing beams 5″ x 5″ x 12″ was filled with concrete mixture used in the test set forth in Table III. After hardening for 3 days, the upper half of the form was filled with the same concrete, mixed at that time, and without changing the concrete on the surface of the old concrete. After the upper portion of the concrete was cured for 7 days, the samples were tested for flexural strength. The results obtained are listed in columns 7 and 8 of Table III, the flexural strengths listed giving measure of the quality of the concrete surface.

The conjoint use of the fluidity-increasing agent and the gas-entraining agent can be employed with other materials which are commonly added to concrete and mortar mixes, such as densifying, water-repellent, dispersing or setting time-regulating compounds, etc.

Since it is obvious that various changes and modifications may be made in the above description without departing from the nature or spirit thereof, this invention is not restricted thereto except as set forth in he appended claims.

We claim:

1. A method of improving the frost-resistance of structures formed from concrete or mortar mixes having a hydraulic cement binding agent, which comprises incorporating a gas-entraining agent and a fluidity-increasing agent at any stage prior to the completion of the mixing of the components constituting the mix, the fluidity increasing agent being selected from the group consisting of tartaric acid, citric acid, saccharic acid, and tetrahydroxy adipic acid.

2. A method of improving the frost-resistance of structures formed of concrete or mortar mixes having a hydraulic cement binding agent, which comprises incorporating a gas-entraining agent and a fluidity-increasing agent in the hydraulic binding agent, and thereafter mixing such hydraulic binding agent with the other components of the mix, the fluidity increasing agent being selected from the group consisting of tartaric acid, citric acid, saccharic acid, and tetrahydroxy adipic acid.

3. A method of improving the frost-resistance of structures formed of concrete or mortar mixes having a hydraulic cement binding agent, which comprises incorporating a gas-entraining agent in the hydraulic binding agent, mixing said hydraulic binding agent with the other components of the mix, and prior to the completion of said mixing incorporating a fluidity-increasing agent, the fluidity increasing agent being selected from the group consisting of tartaric acid, citric acid, saccharic acid, and tetrahydroxy adipic acid.

4. A method of improving the frost-resistance of structures formed of concrete or mortar mixes having a hydraulic cement binding agent, which comprises incorporating a gas-entraining agent and a fluidity-increasing agent in the gage water, and mixing said gage water with the other components of the mix, the fluidity increasing agent being selected from the group consisting of tartaric acid, citric acid, saccharic acid, and tetrahydroxy adipic acid.

5. A concrete or mortar containing a hydraulic cement as the binding agent, an agent which increases the fluidity of the suspensoids, and a gas-entraining agent, the presence of both the fluidity-increasing agent and the gas-entraining agent imparting frost-resisting properties to structures formed of said concrete or mortar, the fluidity increasing agent being selected from the group consisting of tartaric acid, citric acid, saccharic acid, and tetrahydroxy adipic acid.

6. A concrete or mortar as set forth in claim 5, wherein the gas-entraining agent is a substance which produces a gas when said concrete or mortar is mixed.

7. A concrete or mortar as set forth in claim 5, wherein the gas-entraining agent is an alkali-soluble resin.

8. A concrete or mortar as set forth in claim 5, wherein the gas-entraining agent is an alkali salt of a resin.

9. A concrete or mortar as set forth in claim 5, wherein the gas-entraining agent is selected from the group consisting of the gasoline-insoluble resin obtained from pine and fir trees and alkali salts thereof.

10. A concrete or mortar as set forth in claim 5, wherein the fluidity-increasing agent is a substance containing the acyl group of tetrahydroxy adipic acid.

11. A concrete or mortar containing a hydraulic cement as the binding agent, 0.005% to 0.5% of a gas-entraining agent, and 0.02% to 0.5% of a fluidity-increasing agent, the proportions being by weight and based on the hydraulic binding agent, the fluidity increasing agent being selected from the group consisting of tartaric acid, citric acid, and saccharic acid, and tetrahydroxy adipic acid.

12. A concrete or mortar as set forth in claim 11, wherein the gas-entraining agent is an alkali-soluble resin.

13. A concrete or mortar as set forth in claim 11, wherein the gas-entraining agent is an alkali salt of a resin.

14. A concrete or mortar as set forth in claim 11, wherein the gas-entraining agent is selected from the group consisting of the gasoline-insoluble resin obtained from pine and fir trees and the alkali salts thereof.

FRITZ A. SCHENKER.
ALPHONS AMMANN.

REFERENCES CITED

The following references are of record in the file of this patent:

UNITED STATES PATENTS

| Number | Name | Date |
|---|---|---|
| 528,995 | Smith | Nov. 13, 1894 |
| 2,174,051 | Winkler | Sept. 26, 1939 |
| 2,360,518 | Scripture | Oct. 17, 1944 |
| 2,478,831 | MacPherson | Aug. 9, 1949 |

FOREIGN PATENTS

| Number | Country | Date |
|---|---|---|
| 379,320 | Great Britain | 1932 |

OTHER REFERENCES

Barton, Air Entraining Cement Manufacture Rock Products for Nov. 1944, pgs. 39 and 112.